(12) United States Patent
Abe

(10) Patent No.: US 9,032,049 B2
(45) Date of Patent: May 12, 2015

(54) COMMUNICATION METHODS AND SYSTEMS BETWEEN A STORAGE APPARATUS, A USER TERMINAL AND A DEVICE CONNECTED TO THE STORAGE APPARATUS

(75) Inventor: Noriyuki Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 145 days.

(21) Appl. No.: 13/297,750

(22) Filed: Nov. 16, 2011

(65) Prior Publication Data

US 2012/0311097 A1 Dec. 6, 2012

(30) Foreign Application Priority Data

May 30, 2011 (JP) ................................. 2011-120983

(51) Int. Cl.
*G06F 15/16* (2006.01)
*H04L 29/08* (2006.01)
*H04L 29/06* (2006.01)

(52) U.S. Cl.
CPC .............. *H04L 67/303* (2013.01); *H04L 63/029* (2013.01); *H04L 67/2842* (2013.01)

(58) Field of Classification Search
CPC ........ H04L 45/22; H04L 67/16; H04L 63/029
USPC ......................................................... 709/219
See application file for complete search history.

(56) References Cited

U.S. PATENT DOCUMENTS

| | | | | |
|---|---|---|---|---|
| 6,349,336 B1 * | 2/2002 | Sit et al. | ......................... | 709/227 |
| 7,120,692 B2 * | 10/2006 | Hesselink et al. | ............. | 709/225 |
| 7,191,448 B2 * | 3/2007 | Simpson et al. | .............. | 719/311 |
| 7,254,601 B2 * | 8/2007 | Baller et al. | .................. | 709/200 |
| 7,333,990 B1 * | 2/2008 | Thiagarajan et al. | ......... | 709/203 |
| 7,441,270 B1 * | 10/2008 | Edwards et al. | ................ | 726/15 |
| 7,457,840 B2 * | 11/2008 | Futatsugi | ..................... | 709/205 |
| 7,640,580 B1 * | 12/2009 | Plotnikov et al. | ............... | 726/12 |
| 7,752,301 B1 * | 7/2010 | Maiocco et al. | .............. | 709/224 |
| 7,921,198 B2 * | 4/2011 | Fernarndez Gutierrez | ... | 709/223 |
| 7,984,165 B2 * | 7/2011 | Fujimoto et al. | .............. | 709/228 |

(Continued)

FOREIGN PATENT DOCUMENTS

| | | |
|---|---|---|
| JP | A-2000-047955 | 2/2000 |
| JP | 2002-223483 A | 8/2002 |

(Continued)

OTHER PUBLICATIONS

Elster Electricity. (Oct. 27, 2005). Remote Internet Access to Meters on Networks Protected by Firewalls. 5 pp. Retrieved from http://ip.com/IPCOM/000130578.*

(Continued)

*Primary Examiner* — Kristie Shingles
*Assistant Examiner* — Timothy Sowa
(74) *Attorney, Agent, or Firm* — Oliff PLC

(57) ABSTRACT

A communication system includes a user terminal connected to a first communication line, a device connected to the first communication line, and storing data to be updated, and a storage apparatus connected to a second communication line and storing the data transmitted from the device. A communication originated at the storage apparatus and addressed to the device and the user terminal is blocked by a firewall apparatus while a communication from the storage apparatus to the user terminal in reply to a request from the user terminal is permitted by the firewall apparatus.

19 Claims, 9 Drawing Sheets

(56) References Cited

U.S. PATENT DOCUMENTS

| | | | |
|---|---|---|---|
| 8,024,468 B2* | 9/2011 | Raciborski et al. | 709/227 |
| 8,250,219 B2* | 8/2012 | Raciborski et al. | 709/227 |
| 8,291,011 B2* | 10/2012 | Abu-Hakima et al. | 709/203 |
| 2001/0034791 A1* | 10/2001 | Clubb et al. | 709/238 |
| 2002/0013807 A1* | 1/2002 | Richard | 709/202 |
| 2002/0055977 A1 | 5/2002 | Nishi | |
| 2002/0138596 A1* | 9/2002 | Darwin et al. | 709/220 |
| 2002/0165954 A1* | 11/2002 | Eshghi et al. | 709/224 |
| 2003/0097479 A1* | 5/2003 | Zellers | 709/249 |
| 2003/0154306 A1* | 8/2003 | Perry | 709/245 |
| 2003/0182363 A1* | 9/2003 | Clough et al. | 709/203 |
| 2005/0005030 A1* | 1/2005 | Asai | 709/249 |
| 2005/0027820 A1* | 2/2005 | O'Laughlen et al. | 709/217 |
| 2005/0229243 A1* | 10/2005 | Svendsen et al. | 726/12 |
| 2005/0273863 A1* | 12/2005 | Nakao et al. | 726/26 |
| 2007/0180512 A1* | 8/2007 | Chaudhuri et al. | 726/12 |
| 2008/0162698 A1* | 7/2008 | Hopen et al. | 709/226 |
| 2008/0170585 A1* | 7/2008 | Shoji et al. | 370/449 |
| 2009/0234968 A1* | 9/2009 | Thomas et al. | 709/241 |
| 2010/0077019 A1* | 3/2010 | Holk et al. | 709/203 |
| 2011/0208809 A1* | 8/2011 | Ito | 709/203 |
| 2011/0252117 A1* | 10/2011 | Sng et al. | 709/219 |

FOREIGN PATENT DOCUMENTS

| | | |
|---|---|---|
| JP | 2004-213507 A | 7/2004 |
| JP | 2006-011703 A | 1/2006 |
| JP | A-2008-131276 | 6/2008 |

OTHER PUBLICATIONS

Severance, Charles. (2009). Ch: 8—App Engine Data Store. In Using Google App Engine. Sebastopol, CA: O'Reilly Media.*

Newton, et al. (2011). Newton's Telecom Dictionary. New York City, NY: Flatiron Publishing.*

Jan. 20, 2015 Office Action issued in Japanese Application No. 2011-120983.

* cited by examiner

| WEB PAGE P10 | | |
|---|---|---|
| DEVICE ID | IMAGE FORMED IN THE MONTH | POWER CONSUMED IN THE MONTH |
| 001 | 2000 PAGES | 50 kWh |
| 002 | 800 PAGES | 20 kWh |
| 003 | 1000 PAGES | 30 kWh |

US 9,032,049 B2

COMMUNICATION METHODS AND SYSTEMS BETWEEN A STORAGE APPARATUS, A USER TERMINAL AND A DEVICE CONNECTED TO THE STORAGE APPARATUS

CROSS-REFERENCE TO RELATED APPLICATIONS

This application is based on and claims priority under 35 USC 119 from Japanese Patent Application No. 201-120983 filed May 30, 2011.

BACKGROUND (i) Technical Field

The present invention relates to a communication method, a storage apparatus and a communication system.

SUMMARY

According to an aspect of the invention, there is provided a communication method of a communication system. The communication system includes a user terminal connected to a first communication line, a device connected to the first communication line, and storing data to be updated, and a storage apparatus connected to a second communication line and storing the data transmitted from the device. A communication originated at the storage apparatus and addressed to the device and the user terminal is blocked by a firewall apparatus while a communication from the storage apparatus to the user terminal in reply to a request from the user terminal is permitted by the firewall apparatus. The communication method includes transmitting the data from the device to the storage apparatus via the first communication line and the second communication line, receiving the data transmitted from the device and writing the received data on a storage unit, placing a request via the first communication line and the second communication line to the storage apparatus to request the storage apparatus to transmit device information responsive to the data, transmitting in reply to the request to the storage apparatus a transfer request to the user terminal having requested the device information, the transfer request including a data transmission request requesting the device to transmit the data to the storage apparatus, and a communication address assigned to the device, the transfer request requesting the user terminal to transfer the data transmission request to the device, receiving the transmitted transfer request, and transferring the data transmission request included in the transfer request to the device having the communication address assigned thereto and included in the transfer request, transmitting the data stored on the device to the storage apparatus if the data transmission request transferred from the user terminal is received, placing a request again via the first communication line and the second communication line to the storage apparatus to request the storage apparatus to transmit the device information, and transmitting to the user terminal having requested again the device information the device information responsive to the transmitted data in reply to the request.

BRIEF DESCRIPTION OF THE DRAWINGS

Exemplary embodiments of the present invention will be described in detail based on the following figures, wherein.

DETAILED DESCRIPTION

An exemplary embodiment of the present invention is described below with reference to the drawings.

Figure 1:
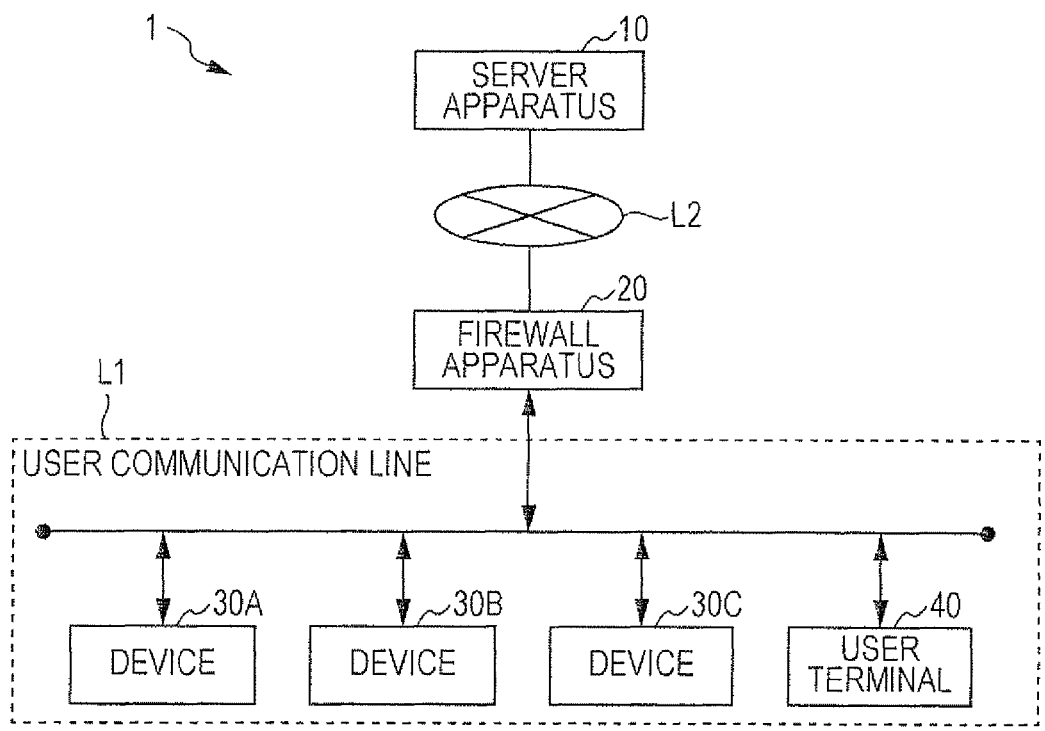
FIG. 1 is a block diagram generally illustrating a communication system of an exemplary embodiment.

FIG. 1 is a block diagram generally illustrating a communication system 1 of the exemplary embodiment of the present invention.

The communication system 1 includes server apparatus 10, firewall apparatus 20, devices 30A, 30B, and 30C (also referred to as a device 30 if it is not necessary to discriminate one device from another among the devices 30A, 30B, and 30C). The communication system 1 also includes a communication node, such as a user terminal 40, and a communication line. The communication lines include a user communication line L1 like an in-house local area network (LAN), and an external communication line L2 such the Internet. The firewall apparatus 20 protects the communication node connected to the user communication line L1 from an access and a request coming in via the external communication line L2. The word "protected" means that an access and a request from the communication node connected to the external communication line L2 are blocked by the firewall apparatus 20 and unable to reach the communication node connected to the user communication line L1. The "access to the communication node" herein refers to a retrieval of data stored on the communication node, and the "request to the communication node" refers to requesting the communication node to do any operation. However, the firewall apparatus 20 permits the server apparatus 10 to place a request on the communication node requesting the communication node to perform a particular process (such as a transfer process) in a particular method (hypertext transfer protocol (HTTP) response). This process is described below in detail. In the communication system 1, the server apparatus 10 connected to the external communication line L2 collects from the device 30 connected to the user communication line L1 data indicating a past record and history of use (hereinafter referred to as "device data") and then stores the device data. In the present invention, the server apparatus 10 is an example of a "storage apparatus," the device data is an example of "data." The user communication line L1 is an example of a "first communication line," and the external communication line L2 is an example of a "second communication line."

The firewall apparatus 20 is connected to the external communication line L2 and the user communication line L1. The firewall apparatus 20 blocks the accessing of the server apparatus 10 to the data stored on the communication node (the device 30 and the user terminal 40) connected to the user communication line L1. On the other hand, the firewall apparatus 20 permits the communication node connected to the user communication line L1 to transmit an HTTP request to the server apparatus 10. The firewall apparatus 20 also permits the communication node connected to the user communication line L1 to receive an HTTP response transmitted from the server apparatus 10 in response to the HTTP request. In other words, the firewall apparatus 20 permits the communication node connected to the user communication line L1 to access via HTTP to the server apparatus 10. The firewall apparatus 20 also permits the data to be transmitted from the communication node connected to the user communication line L1 to the server apparatus 10. The firewall apparatus 20 further permits an HTTP response (redirect instruction such as HTTP 307) to be transmitted from the server apparatus 10 to the communication node connected to the user communication line L1. HTTP 307 is the particular process, such as an HTTP response requesting the communication node to perform a transfer process. In other words, the firewall apparatus 20 in the communication system 1 blocks a communication originated at the server apparatus 10 and addressed to the device 30 and the user terminal 40. On the other hand, the firewall apparatus 20 permits a communication from the server apparatus 10 to the user terminal 40 in reply to a request from the user terminal 40 and a communication from the device 30 and the user terminal 40 to the server apparatus 10. The communication refers to the communication for accessing, requesting, and/or transmission.

The server apparatus 10 is a web server apparatus connected to the external communication line L2. The server apparatus 10 transmits a web page including the device data to the user terminal 40 that has accessed the server apparatus 10 via the user communication line L1 and the external communication line L2. The web page includes a list of a device ID (identification) identifying each device, a past record and history indicated by the device data corresponding to the device ID, and information based on these pieces of information, such as a record of this month and a cumulative value. The information represented by the list is information of each device based on the device data, and is referred to as "device information." The device information may be another kind of information as long as the device information is based on the device data. The web page reaches the user terminal 40 without being blocked by the firewall apparatus 20.

The device 30 provides a user with a particular function by performing an operation. The device 30 may be an image forming apparatus having a printing, a copying or a faxing function. The device data represents a past record of use and a history of the device (for example, time and date of image forming, an amount of image formed, and power consumed per month). The device 30 transmits the device data to the server apparatus 10 at predetermined time intervals (every day, or every week, for example). The device data reaches the server apparatus 10 without being blocked by the firewall apparatus 20 as described above. The device 30 also transmits the web page described below to the user terminal 40. The transmission of the web page is performed in the communication internal to the user communication line L1 and is thus not blocked by the firewall apparatus 20.

The user terminal 40 is an image processing terminal such as a personal computer used by a user. The user terminal 40 stores an information browsing program called a browser, and accesses the server apparatus 10 by executing the information browsing program. The user terminal 40 thus displays a web page included in the HTTP response from the server apparatus 10. The user terminal 40 also displays a web page transmitted from the device 30 by executing the information browsing program.

Figure 2:
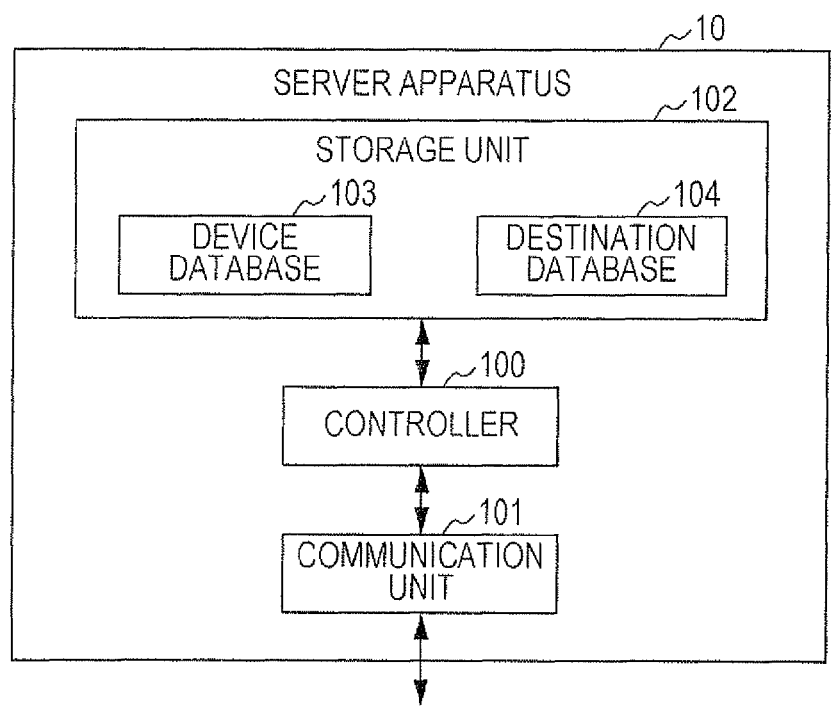
FIG. 2 is a block diagram illustrating a hardware configuration of a server apparatus.

FIG. 2 illustrates a hardware configuration of the server apparatus 10. The server apparatus 10 includes controller 100, communication unit 101, and storage unit 102. The controller 100 includes a central processing unit (CPU), read-only memory (ROM), and a random-access memory (RAM). The CPU executes a program stored on the ROM or the storage unit 102, using the RAM as a work area. The CPU thus controls operation of each of the elements in the server apparatus 10. The communication unit 101 communicates the device 30 and the user terminal 40 via the external communication line L2. The storage unit 102 is a writable storage unit, and may be a hard disk, for example. The storage unit 102 stores a program group describing a procedure of a process to be executed by the controller 100. The storage unit 102 also stores a uniform resource locator (URL) as a communication address of the server apparatus 10, a device database 103, and a destination database 104.

The device database 103 stores, in a mapped state, the device data transmitted from the device 30, time at which the device data is stored on the storage unit 102, and a device ID of the device having transmitted the device data. The destination database 104 has a URL written thereon as a communication address assigned to the device 30. The URL serves as a destination when the communication node connected to the user communication line L1 (the user terminal 40, for example) transmits the data to the device 30. The URL is thus destination data. The URL is not accessed by the server apparatus 10 as the communication node connected to the external communication line L2 but accessed by the user terminal 40 as the communication node connected to the user communication line L1. The storage unit 102 is an example of a "storage unit" or a "second storage unit."

Figure 3:
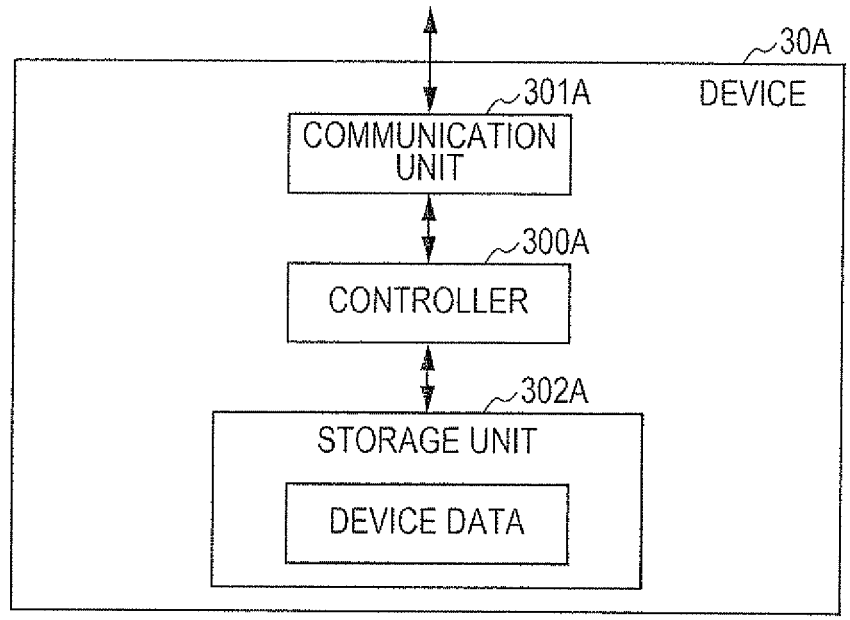
FIG. 3 is a block diagram illustrating a hardware configuration of a device.

FIG. 3 is a block diagram illustrating a hardware configuration of the device 30A. The device 30A includes controller 300A, communication unit 301A, and storage unit 302A. If the device 30A is an image forming apparatus, the device 30A may further include an image forming unit that forms an image through an electrophotographic method. The controller 300A includes a CPU, and storage units such as a ROM and a RAM. The CPU controls the operation of each of the elements of the device 30A by executing a program stored on the ROM or the storage unit 302A with the RAM serving as a work area. The communication unit 301A communicates with the server apparatus 10 via the user communication line L1 and the external communication line L2, and also communicates with the user terminal 40 via the user communication line L1. The storage unit 302A is a writable storage unit, and may be a hard disk device. The storage unit 302A stores the device data in addition to a program group describing a procedure of a process to be executed by the controller 300A. The device data are device data generated by the device 30A, and are updated each time the device 30A performs a function. The storage unit 302A is an example of a "first storage unit" in the present invention. The devices 30B and 30C are identical in structure to the device 30A. One of the suffixes A, B, and C is attached to each of the elements of the device 30 to identify which of the devices 30A, 30B, and 30C the element belongs to. When it is not necessary to discriminate one element from another among the elements of the devices 30A, 30B, and 30C, no suffix is attached to the element.

Figure 4:
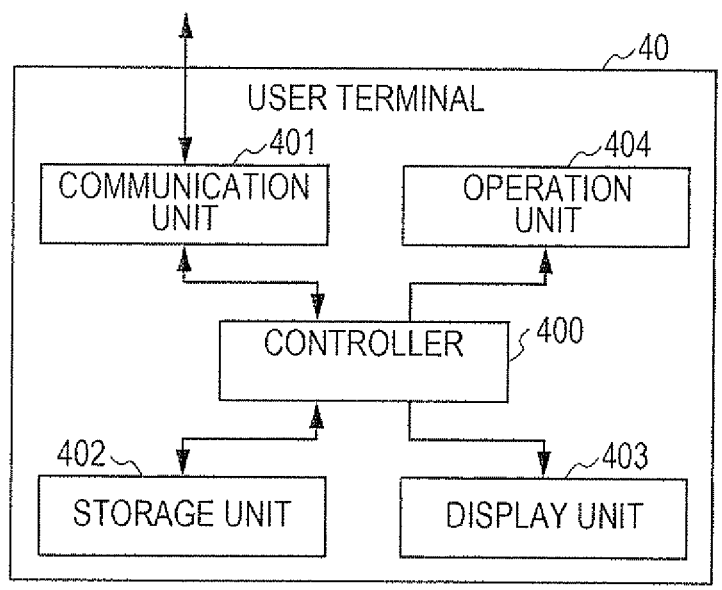
FIG. 4 is a block diagram illustrating a hardware configuration of a user terminal.

FIG. 4 is a block diagram illustrating a hardware configuration of the user terminal 40. The user terminal 40 includes controller 400, communication unit 401, storage unit 402, display unit 403, and operation unit 404. The controller 400 includes a CPU, and a storage unit such as a ROM or a RAM. The CPU controls each of the elements of the user terminal 40 by executing a program stored on the ROM or the storage unit 402 with the RAM served as a work area. The communication unit 401 communicates with the server apparatus 10 via the user communication line L1 and the external communication line L2, and also communicates with the device 30 via the user communication line L1. The storage unit 402 is a writable storage unit, and may be a hard disk, for example. The storage unit 402 stores a program group describing a procedure of a process to be executed by the controller 400, for example, the information browsing program. The display unit 403 includes a display, and displays a web page retrieved from the server apparatus 10. The operation unit 404 includes a mouse, a keyboard, and the like. The operation unit 404 supplies the controller 100 with operation data of a user who operates the user terminal 40.

An update process of the device data in the communication system 1 is described.

Figure 5:
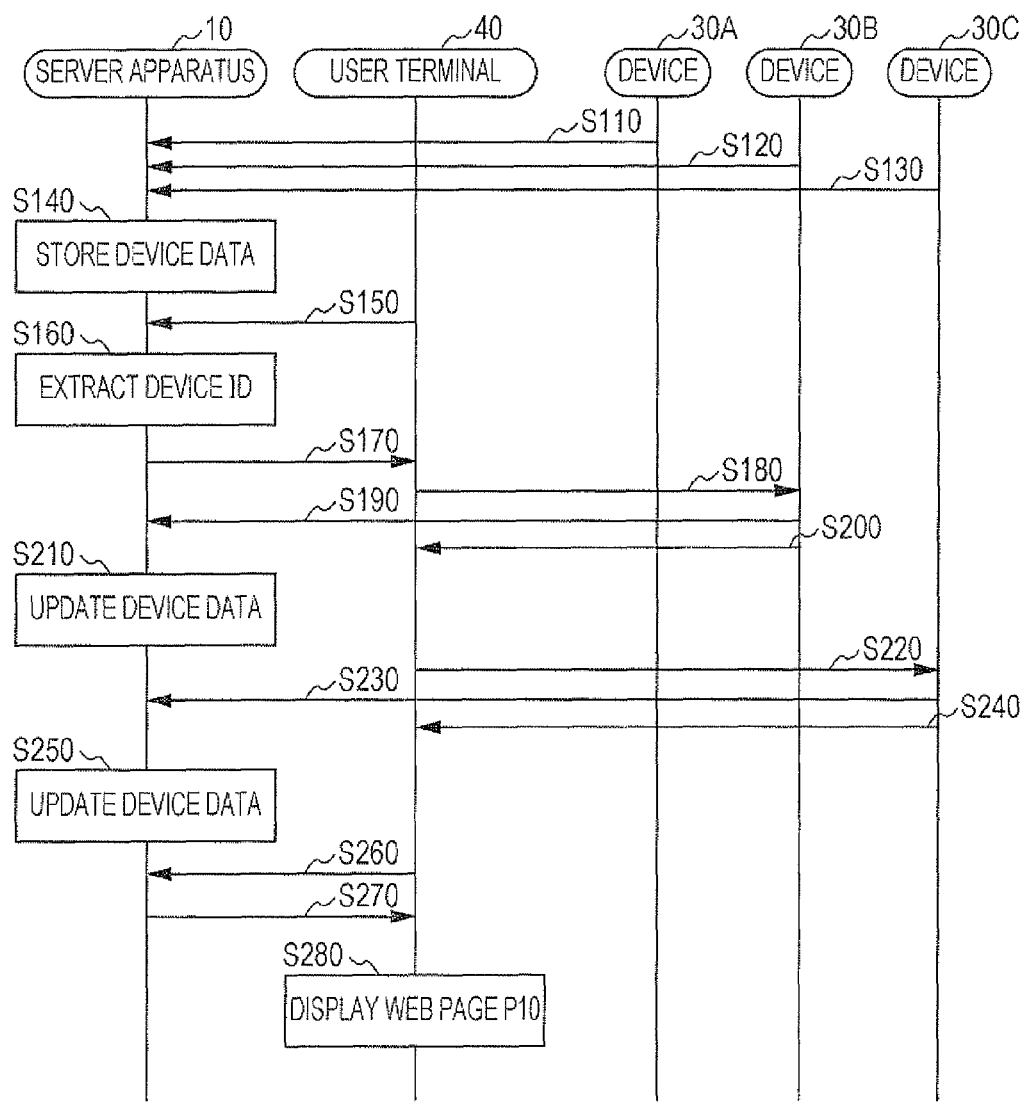
FIG. 5 is a sequence chart illustrating an update process of device data.

FIG. 5 is a sequence chart of the update process of the device data. At a transmission timing, i.e., at the time intervals, the devices 30A, 30B, and 30C transmit the device data stored thereon to the server apparatus 10 (steps S110, S120, and S130). Since the device data is transmitted from the communication node (the device 30) connected to the user communication line L1 to the server apparatus 10, the firewall apparatus 20 does not block the device data. The server apparatus 10 writes the received device data onto the storage unit 102 (step S140). Operations in steps S110 through S140 are repeated each time the transmission timing of the device data has come.

To check the updated device information, the user may operate the user terminal 40 and place a request to browse the device information. In response to the request, the user terminal 40 transmits an HTTP request to the server apparatus 10. The user terminal 40 thus requests the server apparatus 10 to transmit the device information (step S150). Since the HTTP request is transmitted from the communication node connected to the user communication line L1 (the user terminal 40), the firewall apparatus 20 does not block the HTTP request as described above.

Upon receiving the HTTP request from the user terminal 40 in step S150, the server apparatus 10 extracts the device ID of a device satisfying a condition to be discussed below, from among plural devices 30 (step S160). The condition is to be satisfied to extract the device data on which a predetermined time has elapsed since a previous updating. More in detail, the device that satisfies the condition is a device that has not transmitted the device data since the predetermined time earlier than the time of the request of the device information by the user terminal 40. The predetermined time may be 24 hours, for example. It is assumed in this case that the devices 30B and 30C satisfy the condition, and that the device IDs "002" and "003" are extracted.

Upon extracting the device ID of the device 30 satisfying the above condition, the server apparatus 10 retrieves, from a destination database, URLs (i.e., the URLs of the device 30B and the device 30C) corresponding to the device IDs. The server apparatus 10 then transmits to the user terminal 40 the HTTP response (HTTP 307) including a transfer request (step S170). The transfer request includes a data transmission request requesting the device 30 to transmit the device data to own apparatus, and the extracted URLs as transfer destinations. The HTTP response is transmitted from the server apparatus 10 to the communication node connected to the user communication line L1, and is not blocked by the firewall apparatus 20.

The user terminal 40 transfers the data transmission request, included in the transfer request included in the transmitted HTTP response, to the URL included in the transfer request (URL of the device 30B in this case) together with the URL (step S180). The operation executed by the device 30B having received these pieces of information is different depending on whether multiple URLs are received or not. In this case, the number of URLs received by the device 30B (the URLs of the devices 30B and 30C) is multiple. The device 30B then transmits to the server apparatus 10 the device data stored on the storage unit 302 in response to the received data transmission request (step S190). The device 30B transmits to the user terminal 40 the HTTP response including the transfer request. The transfer request includes the multiple URLs with own URL excluded and the data transmission request (step S200). Upon receiving the device data transmitted from the device 30B in step S190, the server apparatus 10 updates the device data received from the device 30B in the past out of the device data stored on the storage unit 102 in accordance with the received device data (step S210).

The user terminal 40 transfers the data transmission request included in the transfer request included in the HTTP response to the URL included in the transfer request (the URL of the device 30C here) together with the URL (step S220). The operation of the device 30C is different depending on whether the device 30C has received a single URL or multiple URLs. The number of URLs received by the device 30C is a single URL (the URL of the device 30C). In response to the received data transmission request, the device 30C transmits the device data stored thereon to the server apparatus 10 (step S230). The device 30C transmits to the user terminal 40 information including no URL and indicating that the device data has been transmitted (step S240). The server apparatus 10 receives the device data transmitted in step S230 by the device 30C. Upon receiving the device data, the server apparatus 10 updates the device data transmitted from the device 30C in the past out of the device data stored on the storage unit 102 (step S250).

Since the information received in step S240 includes no URL, the user terminal 40 transmits again the HTTP request requesting the server apparatus 10 to transmit the device information (step S260). Upon receiving the HTTP request from the user terminal 40, the server apparatus 10 transmits to the user terminal 40 the device information responsive to the device data written on the device database 103 (step S270). The device information is described on a web page P10 (see FIG. 6) included in the HTTP response transmitted by the server apparatus 10. Since the HTTP response is transmitted from the server apparatus 10 to the user terminal 40, the user terminal 40 receives the HTTP response without being blocked by the firewall apparatus 20 as described above. The user terminal 40 thus displays on the display unit 403 the web page P10 included in the received HTTP response and having the device information written thereon in accordance with the device data (step S280). The device information responsive to the device data updated in steps S210 and S250 is described on the web page P10 (see FIG. 6) displayed in step S280. The display unit 403 in the user terminal 40 displays the device information responsive to the device data updated within 24 hours.

Figures 6A, 6B:
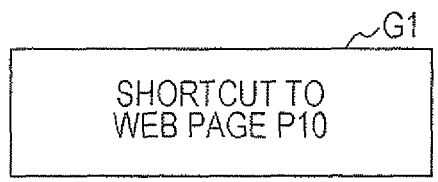
FIGS. 6A and 6B illustrate a screen presented on the user terminal.

An example of an image displayed on the display unit 403 of the user terminal 40 in the above process is described with reference to FIGS. 6A and 6B. FIG. 6A illustrates an image G1 representing a shortcut to the web page P10. The image G1 includes a character string "SHORTCUT TO WEB PAGE P10" and is displayed on the display unit 403. If the user selects the image G1 using the operation unit 404, the controller 400 executes an operation in step S150. More specifically, the user terminal 40 requests the server apparatus 10 to transmit the web page P10 (having the device information written thereon).

FIG. 6B illustrates the web page P10 displayed on the user terminal 40 in step S280. A table H1 is written on the web page P10. The table H1 includes columns "device ID," "image formed in the month," and "power consumed in the month." The "device ID" column lists device IDs "001," "002," and "003" respectively for the devices 30A, 30B, and 30C illustrated in FIG. 1. The "image formed in the month" column lists the number of pages having the image formed by each device in the month. The "power consumed in the month" column lists the power (kWh) consumed by each device in the month. For example, "2000 pages" and "50 kWh" are listed on the row of "001" as the "device ID." "800 pages" and "20 kWh" are listed on the row of "002" as the "device ID." "1000 pages" and "30 kWh" are listed on the row of "003" as the "device ID." At the point of time of FIG. 6A, the device data serving as a basis for the device information is not described on the device database 103. The device data is described on the device database 103 with the image G1 selected and operations in steps S150-S250 completed. The completion of these operations updates the device data. Subsequent to the updating of the device data, the user terminal 40 places again a transmission request of the web page P10 in step S260. The device information reflecting the updating of the device data, i.e., the table H1 is displayed on the user terminal 40. The updated device information is thus presented to the user.

The functions implemented with each of the controllers 100, 300, and 400 executing the program are described with reference to FIGS. 7, 8, and 9.

Figure 7:
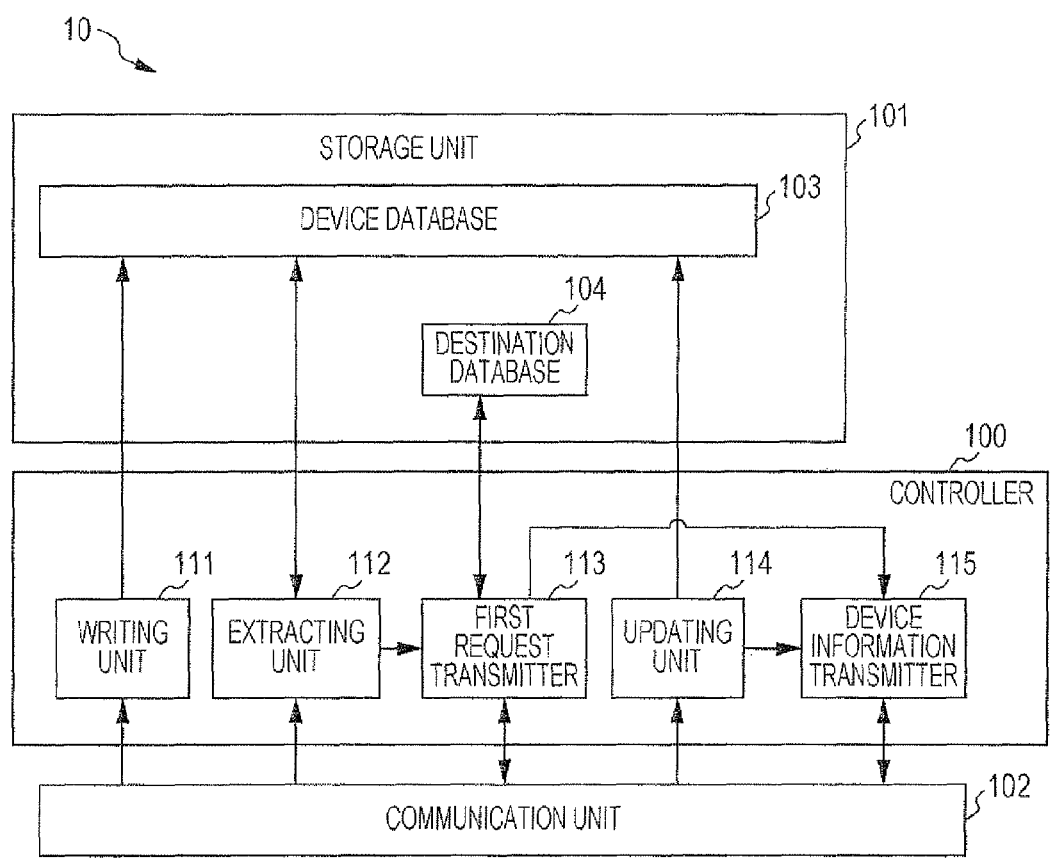
FIG. 7 is a functional block diagram illustrating the server apparatus.

FIG. 7 is a functional block diagram of the controller 100. The controller 100 executes the program, thereby implementing writing unit 111, extracting unit 112, first request transmitter 113, updating unit 114, and device information transmitter 115. The writing unit 111 receives the device data from each device 30 and writes the received device data onto the storage unit 102. If the user terminal 40 requests the device information from the server apparatus 10, the extracting unit 112 extracts the device ID of the device 30 satisfying the condition used in step S160 from among the multiple devices 30. The first request transmitter 113 transmits the transfer request to the user terminal 40 requesting the device information. The transfer request requests the user terminal 40 to transfer the data transmission request to the device 30. The data transmission request requests the device 30 to transmit the device data to own apparatus. The transfer request includes the URL assigned to the device 30 identified by the device ID extracted by the extracting unit 112. The updating unit 114 receives the device data from the device 30. Using the received device data, the updating unit 114 updates the device data written on the device database 103. The updating unit 114 updates the device data after the transfer request is transmitted by the first request transmitter 113. The device information transmitter 115 transmits the device information responsive to the updated device data to the user terminal 40 having requested the device information. In the present invention, the writing unit 111, the extracting unit 112, the first request transmitter 113, the updating unit 114, and the device information transmitter 115 are respectively an example of a "writing unit," an example of an "extracting unit," an example of a "first request transmitter unit," an example of an "updating unit," and an example of a "device information transmitter unit."

Figure 8:
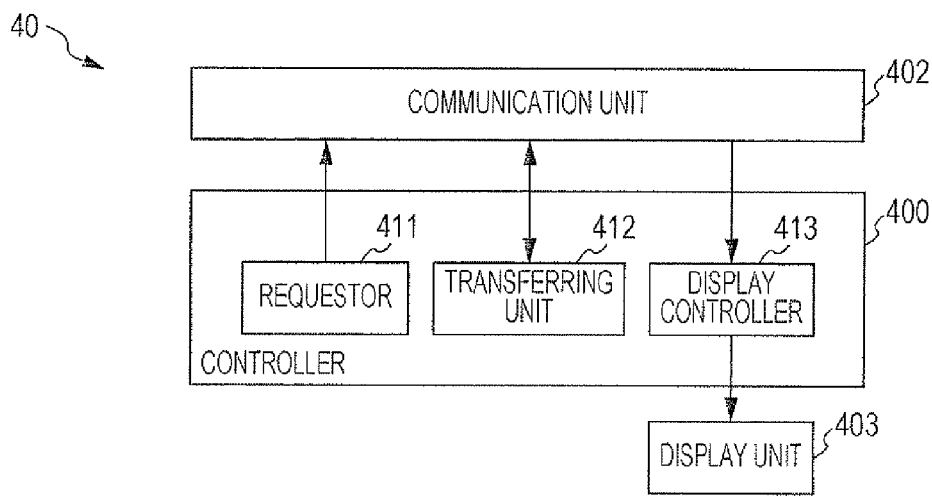
FIG. 8 is a functional block diagram illustrating the user terminal.

FIG. 8 is a functional block diagram of the controller 400. The controller 400 executes the program, thereby implementing requestor 411, transferring unit 412, and display controller 413. The requestor 411 requests the device information from the server apparatus 10 via the user communication line L1 and the external communication line L2. The transferring unit 412 receives the transfer request including the data transmission request and the URL from the server apparatus 10, and transfers the data transmission request included in the received transfer request to the device 30 in accordance with the URL included in the transfer request. When the HTTP response including a web page is transmitted from the server apparatus 10, the display controller 413 controls the display unit 403 to causes the web page (the web page P10 of FIG. 6B is an example) to be displayed on the display unit 403. The requestor 411 is an example of a "requesting unit," and the transferring unit 412 is an example of a "transferring unit" in the present invention.

Figure 9:
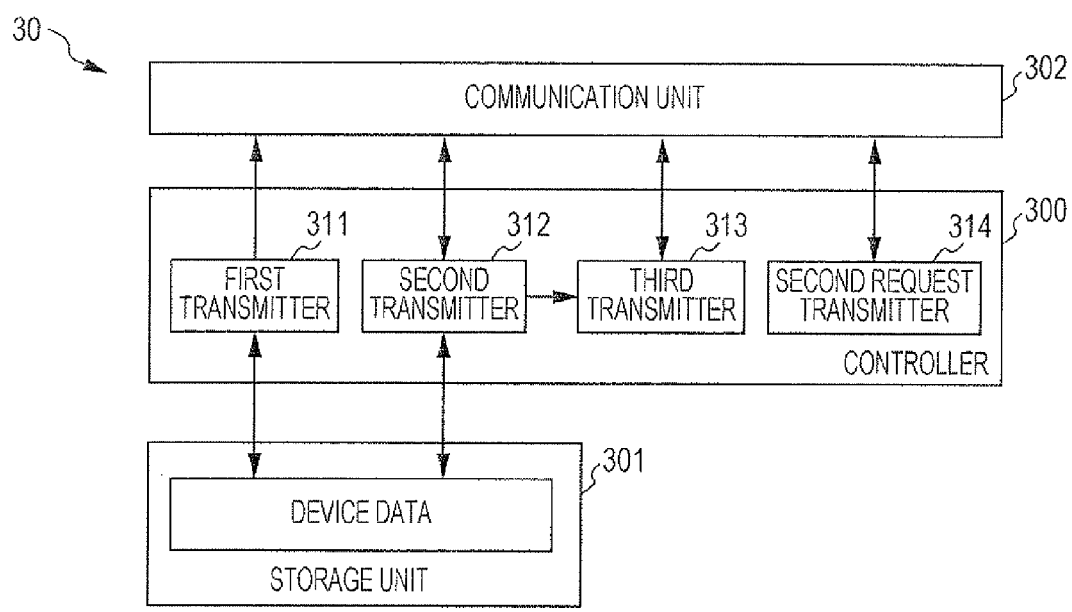
FIG. 9 is a functional block diagram of the device.

FIG. 9 is a functional block diagram of the controller 300. The controller 300 executes the program, thereby implementing first transmitter 311, second transmitter 312, third transmitter 313, and second request transmitter 314. The first transmitter 311 transmits the device data stored on the storage unit 302 to the server apparatus 10 via the user communication line L1 and the external communication line L2. Upon receiving the data transmission request from the user terminal 40, the second transmitter 312 transmits the device data stored thereon to the server apparatus 10. The second transmitter 312 then supplies to the third transmitter 313 data indicating that the device data has been transmitted to the server apparatus 10. The second request transmitter 314 receives the data transmission request and URL from the user terminal 40. If multiple URLs are received, the second request transmitter 314 transmits to the user terminal 40 the transfer request including the data transmission request and the URLs excluding the URL assigned to the device 30. If the data transmission request and a single URL are transmitted from the user terminal 40, the second transmitter 312 transmits the device data. The third transmitter 313 transmits to the user terminal 40 information indicating that the device data has been transmitted. The first transmitter 311 is an example of a "first transmitter unit," the second transmitter 312 is an example of a "second transmitter unit" in the present invention. The third transmitter 313 is an example of a "notification request transmitter unit," and the second request transmitter 314 is an example of a "second request transmitter unit" in the present invention.

In the exemplary embodiment, the server apparatus 10 retrieves the data, serving as a basis for the device information requested by the user terminal 40, from the device 30 that the firewall apparatus 20 does not permit access thereto. The server apparatus 10 thus transmits the device information responsive to the data to the user terminal 40. The server apparatus 10 requests the device having the device ID extracted in accordance with the condition to transmit the device data. The server apparatus 10 is thus free from receiving the device data transmitted from the device 30 that has transmitted the device data since at least a predetermined period of time earlier than the time of request of the device information (i.e., the device 30A in the exemplary embodiment).

MODIFICATIONS

The exemplary embodiment of the present invention has been discussed for exemplary purposes only, and a variety of modifications and changes may be possible and may be combined as appropriate.

First Modification

Using the HTTP response (HTTP 307), the controller 100 functioning as the first request transmitter 113 transmits to the user terminal 40 a request to transfer the data transmission request to the device 30 (the transfer request) and the user terminal 40 transfers the transfer request to the device 30. The present invention is not limited to the specific method described above. For example, the controller 100 transmits a script including the data transmission request to the user terminal 40, thereby causing the user terminal 40 to execute the script. The data transmission request is thus transferred from the user terminal 40 to the device 30, to which the URL included in the data transmission request is assigned. The controller 100 may then transmit the script in accordance with a technique such as asynchronous JavaScript+XML (Ajax). It is sufficient the communication system 1 if the firewall apparatus 20 permits the script to be transmitted from the server apparatus 10 to the communication node connected to the user communication line L1. The conscript and the HTTP response discussed with reference to the exemplary embodiment corresponds to the transfer request transmitted from the server apparatus 10 to the user terminal 40. More specifically, it is sufficient in the communication system 1 if the firewall apparatus 20 permits the transfer request to be transmitted from the server apparatus 10 to the communication node connected to the user communication line L1. A process of the communication system 1 as the first modification of the exemplary embodiment is described with reference to FIGS. 10 and 11A and 11B.

Figure 10:
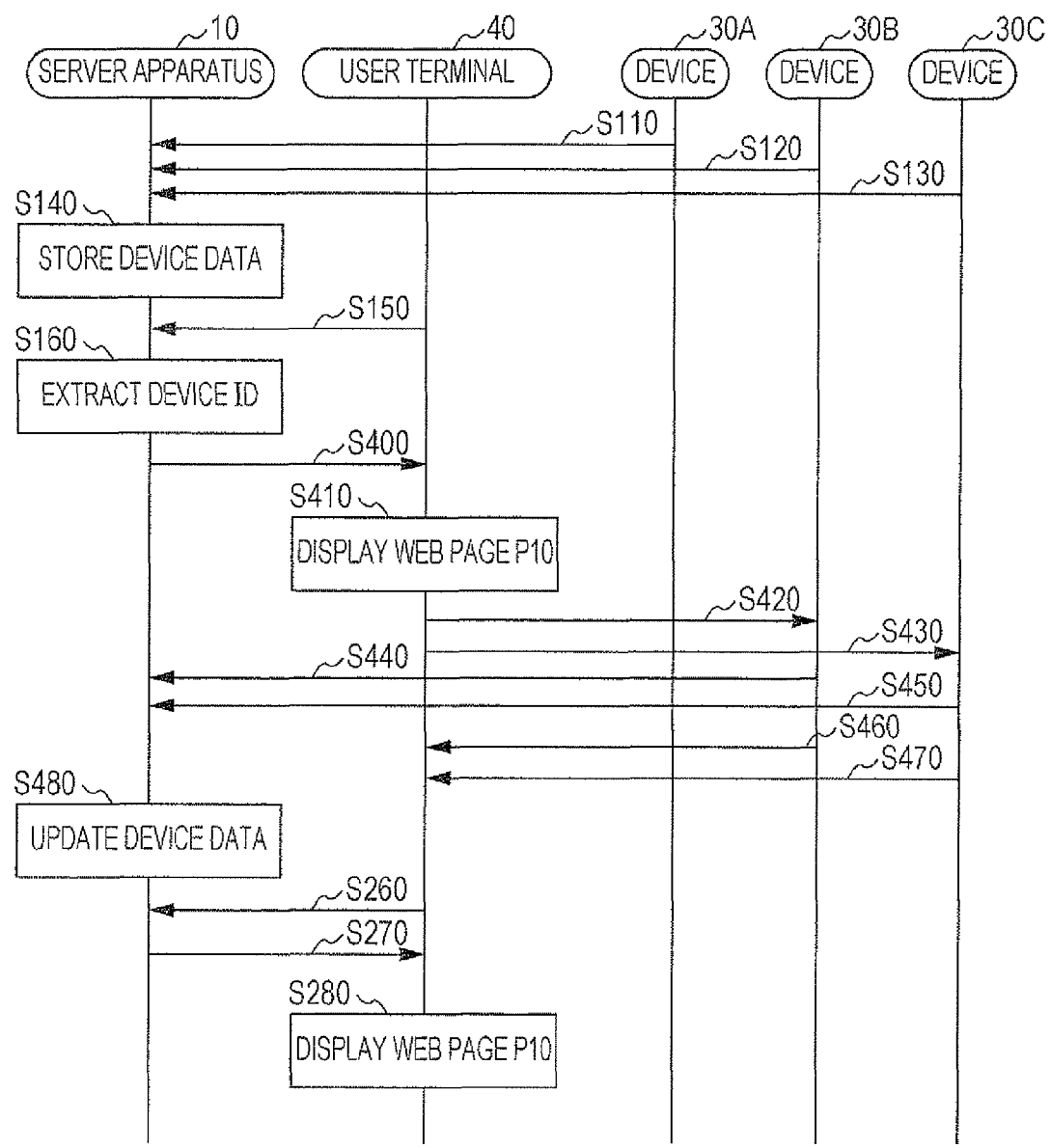
FIG. 10 is a sequence chart of an update process of the device data in a modification of the exemplary embodiment.

FIG. 10 is a sequence chart of an update process of the device data in accordance with the modification. The process illustrated in FIG. 10 is identical to the process of FIG. 5 to step S160. The server apparatus 10 transmits the data transmission request and the web page P10 to the user terminal 40 (step S400). The data transmission request requests the device 30 to transmit the device data to the server apparatus 10. The web page P10 includes the script including as transfer destinations the URLs assigned to the devices 30 (30B and 30C) identified by the device IDs extracted in step S160. The user terminal 40 displays the web page P10 transmitted in step S400 (step S410).

Figure 11A:
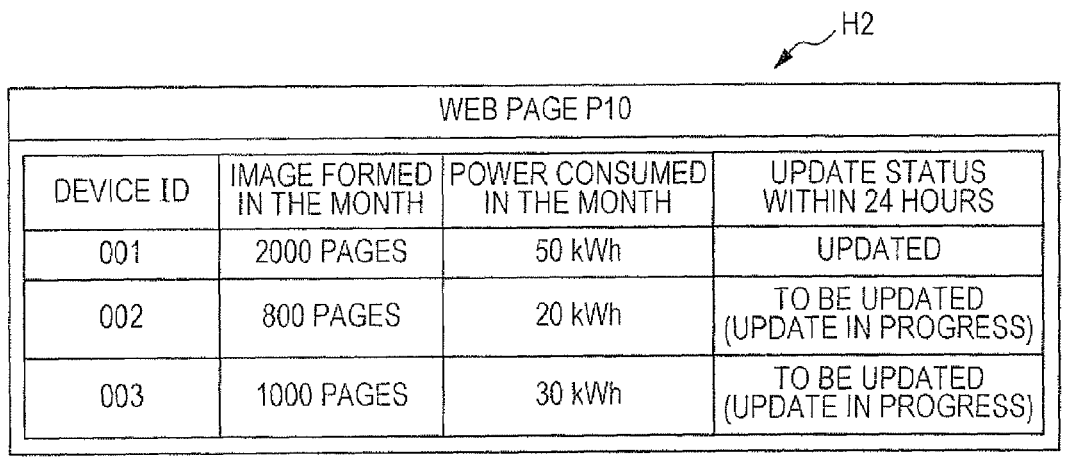
FIGS. 11A and 11B illustrate a web page displayed on a display unit of the user terminal.
Figure 11B:
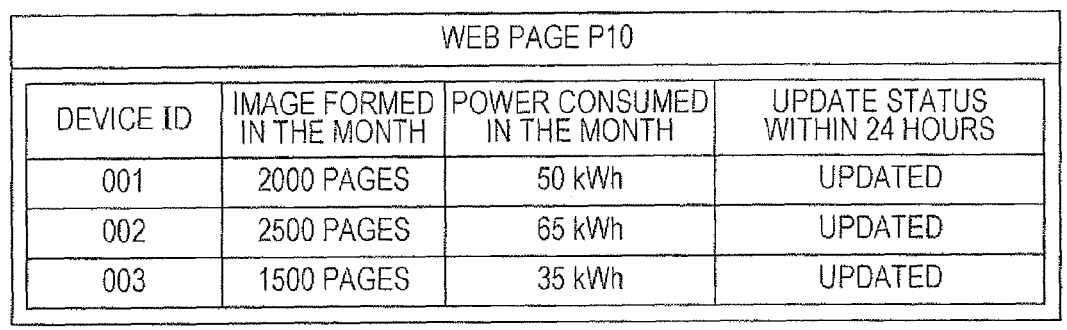

FIGS. 11A and 11B illustrate an example of the web page P10 displayed on the display unit 403 in the user terminal 40 in the process of FIG. 10. FIG. 11A illustrates the web page P10 displayed in step S410. The web page P10 includes a table H2. The table H2 includes the columns "device ID," "image formed in the month," and "power consumed in the month" common to the table H1, and further includes a column "update status within 24 hours." The column "update status within 24 hours" lists a character string representing a determination result of whether the device data satisfies the condition used in step S160. For example, the device data updated 24 hours or more before is labeled a character string "to be updated (update in progress)" and the device data updated within 24 hours is labeled a character string "updated." For example, "2000 pages," "50 kWh" and "updated" are listed on the row of "001" as the "device ID." "800 pages," "20 kWh" and "to be updated (update in progress)" are listed on the row of "002" as the "device ID." "1000 pages," "30 kWh" and "to be updated (update in progress)" are listed on the row of "003" as the "device ID." The table H2 lists the device data written on the device database 103 at the request of the transmission of the web page P10 in step S150. The device data updated within 24 hours and the device data not updated within 24 hours coexist in the table H2.

The user terminal 40 then executes the script transmitted and received in step S400. The user terminal 40 transfers the data transmission request to the devices having the URLs that are transmitted together with the script (steps S420 and S430). Upon receiving the data transmission request, the devices 30B and 30C respectively transmit the device data to the server apparatus 10 (steps S440 and S450). The devices 30B and 30C respectively transmit to the user terminal 40 information indicating that the device data has been transmitted (hereinafter referred to as "completion information") (steps S460 and S470). Upon receiving the device data from each of the devices 30, the server apparatus 10 updates the device data previously transmitted by the devices 30 using the received device data (step S480). The user terminal 40 receives the completion information transmitted in steps S460 and S470, and performs the operation in step S260 of FIG. 5. The operations in steps S270 and S280 then follow. The user terminal 40 may perform the operation in step S260 when the completion information has been received from any of the devices to which the data transmission request is to be transmitted (the devices 30B and 30C here). Alternatively, the user terminal 40 may perform the operation in step S260 each time the completion information has been received.

FIG. 11B illustrates the web page P10 displayed on the display unit 403 in step S280. The web page P10 has a table H3 written thereon. In view of the device information in the table H2, the device information in the table H3 includes increases in the "image formed in the month," and the "power consumed in the month" and a change from "to be updated (update in progress)" to "updated" in the "update status without 24 hours." The device data serving as a basis for the device information is not written on the device database 103 at the time point of step S170. With the image G1 selected, and the operations in step S150 through step S480 illustrated in FIG. 10 performed, the device data is written on the device database 103. The completion of these operations updates the device data. Subsequent to the updating of the device data, the user terminal 40 requests the device information. The device information reflecting the updating of the device data, i.e., the table H3 is displayed on the user terminal 40. The updated device information is thus presented to the user.

In the communication system of the modification, the user terminal 40 executes the script. The data transmission request is transferred to the multiple devices 30 in parallel. Time to update the device data is easily set to be shorter than in the communication system 1 of the exemplary embodiment.

Second Modification

The number of user communication lines L1 is not limited to one. If the user terminal connected to one of multiple user communication lines L1 requests the server apparatus 10 to transmit the device information, the server apparatus 10 transmits the device information responsive to the device data connected to the user communication line L1 of the user terminal.

Figure 12:
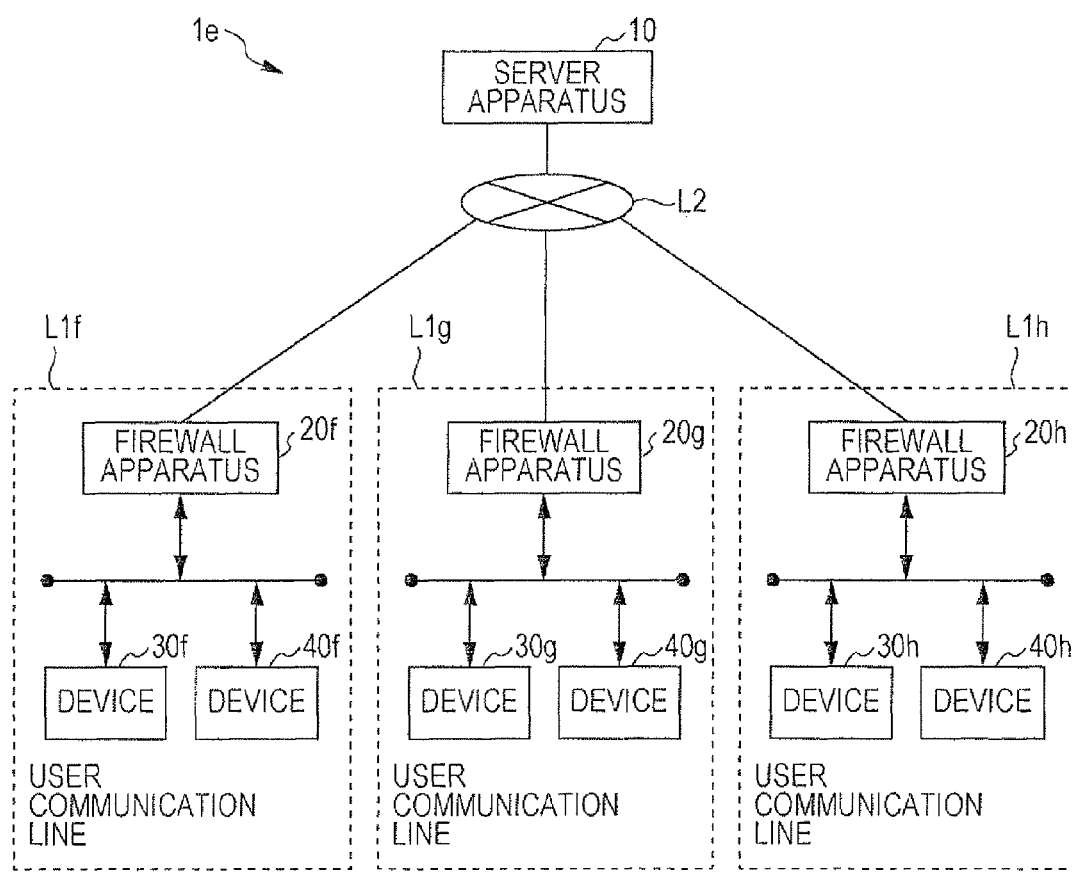
FIG. 12 is a block diagram generally illustrating a communication system of the modification.

FIG. 12 a block diagram generally illustrating a communication system 1e of the modification. The discussion herein focuses on the difference between the communication system 1 in FIG. 1 and the communication system 1e illustrated in FIG. 12. The communication system 1e includes user communication lines L1f, L1g, and L1h respectively connected to the external communication line L2. Connected to the user communication line L1f are firewall apparatus 20f, device 30f, and user terminal 40f. Communication nodes respectively connected to the user communication line L1g and L1h are identical to the communication node connected to the user communication line L1f. The communication nodes connected to the user communication line L1g and L1h are respectively terminated with suffixes the letter "g" and "h" as illustrated in FIG. 12. The server apparatus 10 then writes on the device database 103 a map that maps a communication line ID identifying the user communication line L1 to the device ID and the user ID identifying the user terminal. The user terminal 40g may now request the controller 100 to transmit the device information. The controller 100 simply transmits to the user terminal 40g the device information responsive to the device data of the device 30g corresponding to the communication line ID common to the user terminal 40g. If the device data is not the data updated within 24 hours, the controller 100 transmits to the user terminal 40g the data transmission request and the URL of the device 30g, and then updates the device data as described above. The controller 100, if requested to transmit the device information by the user terminal, simply transmits the device information responsive to the device data of the device connected to the user communication line L1, to which the user terminal is also commonly connected. Even if the multiple user communication lines L1 are employed, the controller 100 transmits the device information responsive to the device data of the device that may be used by the user terminal having requested the device information to be transmitted.

Third Modification

Rather than extracting the device ID in step S160, the server apparatus 10 may transmit the URL, written on the destination database 104, together with the data transmission request in step S170. In the communication system 1 of the exemplary embodiment, the device information responsive to the device data updated subsequent to the request for the device information in step S150 is transmitted. In the communication system 1e of the second modification, server apparatuses 10 respectively operating in response to the user communication lines L1f, L1g, and L1h may be arranged (in other words, three server apparatuses 10 may be arranged). The server apparatus 10, without the need for extracting the device ID, updates the device data of the device 30 connected to the user communication line L1, to which the user terminal 40 having requested the device information to be transmitted is also connected.

Fourth Modification

The user terminal 40 in the exemplary embodiment notifies the user that the device data has been transmitted by displaying the web page on the display unit 403. The present invention is not limited to this notification method. For example, the notification is made using a popup in the display of the user terminal 40. The notification may be made by emitting a sound from a loudspeaker arranged on the user terminal 40. The user terminal 40 may notify the user that the device data has been transmitted or that the device data has been updated. Each of the display unit 403 and the loudspeaker is an example of a "notification unit" in the present invention.

Fifth Modification

In the communication system 1 of the exemplary embodiment, the device 30 transmits to the user terminal 40 the information indicating that the device data has been transmitted. Alternatively, the server apparatus 10 may transmit the information to the user terminal 40. For example, the controller 100 functioning as the device information transmitter 115 may update the device data of the device 30B in step S210 of FIG. 5 before transmitting to the user terminal 40 the information indicating that the device data of the device 30B has been updated. The controller 100 may update the device data of the device 30C in step S250 of FIG. 5 before transmitting to the user terminal 40 the information indicating that the device data of the device 30C has been updated. Using the notification unit of the fourth modification, the user terminal 40 may notify the user whether the device data has been updated. The user of the user terminal 40 thus learns that the device data has been updated. The device information transmitter 115 of the modification functions as a unit of transmitting a notification request requesting that the user be notified of the updating of the device data. The device information transmitter 115 is an example of a "notification request transmitter unit" in the present invention.

Sixth Modification

In the exemplary embodiment, the server apparatus 10 transmits to the user terminal 40 the URLs assigned to the devices 30 in step S170 at a time. Alternatively, the server apparatus 10 may transmit to the user terminal 40 one URL assigned to the device 30 at a time. The operation of transferring the data transmission request in step S180 is performed by the user terminal 40 on each device 30 on a per device basis. One URL is thus included in the HTTP response transmitted from the server apparatus 10. The effect of the leak of the content of the HTTP response, i.e., the risk of leak is reduced more than when multiple URLs are included.

Seventh Modification

In the exemplary embodiment, the URL as a private address is assigned to the device 30. The present invention is not limited to the URL. An Internet Protocol (IP) address may be used instead. A domain name or a host name may be used if a domain name system (DNS) is available in the user communication line L1. Any address may be acceptable as long as the address serves as an address of the transmission of the data to the device 30 connected to the user communication line L1. The URL, the IP address, or the domain name is an example of a "communication address."

Eighth Modification

A method for implementing the storage apparatus (the "server apparatus" in the exemplary embodiment and the modifications) and the communication system falls within the scope of the present invention. A program causing a computer to operate as the storage apparatus falls within the scope of the present invention. The program may be supplied in a recorded state on a recording medium such as an optical disk. The program may also be supplied to the computer by downloading the program via a communication line such as the Internet, and then installing the program onto the computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication method of a communication system including a user terminal connected to a first communication line, a device connected to the first communication line, and a storage apparatus connected to a second communication line, a communication originated at the storage apparatus and addressed to the device and the user terminal being blocked by a firewall apparatus while a communication from the storage apparatus to the user terminal in reply to a request from the user terminal being permitted by the firewall apparatus, the communication method comprising:

receiving, at the storage apparatus, data of the device transmitted from the device to the storage apparatus via the first communication line and the second communication line and writing the received data on a storage unit associated with the storage apparatus, so that the storage apparatus composes device information using device data;

receiving, at the storage apparatus, a request generated by the user terminal and transmitted from the user terminal via the first communication line and the second communication line to request the storage apparatus to transmit device information that is based on the stored data responsive to the data being stored on the storage unit;

transmitting from the storage apparatus, in reply to the request received at the storage apparatus each of:

(1) a transfer request to the user terminal that has generated and transmitted a request for the device information, the transfer request including a data transmission request requesting the device to transmit the data to the storage apparatus, and (2) a communication address assigned to the device, so that both the transfer request and the communication address is transmitted from the storage apparatus, in response to the storage apparatus determining that the device information based on the stored data has not been updated for a predetermined period of time, wherein the transfer request requesting the user terminal to transfer the data transmission request to the device so that when the transmitted transfer request is received on the user terminal, the user terminal transfers the data transmission request included in the transfer request to the device having the communication address assigned thereto, wherein in response to the device receiving the data transmission request transferred from the user terminal, updated data stored on the device is transmitted to the storage apparatus and the device information is updated;

in response to the storage apparatus receiving the updated data from the device, receiving an additional request at the storage apparatus generated by the user terminal via the first communication line and the second communication line to request the storage apparatus to transmit the updated device information; and transmitting, from the storage apparatus to the user terminal having generated and transmitted the additional request for the device information, the updated device information responsive to the transmitted data in reply to the additional request.

2. The communication method according to claim 1, wherein the device information comprises at least one of a record of a month or a value cumulative of power consumption or number of images formed.

3. The communication method according to claim 1, wherein the device information comprises at least one of time and date of image forming, an amount of image formed, or power consumed per month.

4. A storage apparatus in a communication system including a user terminal connected to a first communication line, a device connected to the first communication line, and the storage apparatus connected to a second communication line, the user terminal including a requesting unit and a transferring unit, the requesting unit requesting device information responsive to data from the storage apparatus via the first communication line and the second communication line, the transferring unit on the user terminal receiving a transfer request generated by the user terminal and transmitted from the storage apparatus so that the device information is routed from the device to the user terminal via the storage apparatus, if the device information has not been updated for a period of time, the transfer request including a data transmission request and a communication address assigned to the device, the transfer request requesting the user terminal to transfer the data transmission request to the device, the transferring unit transferring the data transmission request included in the transfer request from the user terminal to the device having the communication address assigned thereto and included in the transfer request, the device including a first storage unit connected to the first communication line and storing the data, a first transmitter unit transmitting the data stored on the first storage unit to the storage apparatus via the first communication line and the second communication line, and a second transmitter unit transmitting the data stored on the first storage unit to the storage apparatus if the data transmission request is received from the transferring unit, a communication originated at the storage apparatus and addressed to the device and the user terminal being blocked by a firewall apparatus connected to the first communication line and the second communication line while a communication from the storage apparatus to the user terminal in reply to a request from the user terminal being permitted by the firewall apparatus, the storage apparatus comprising:

a writing unit that receives the data of the device transmitted by the first transmitter unit of the device to the storage apparatus via the first communication line and the second communication line, and writes the received data on a second storage unit so that the storage apparatus composes device information using device data;

a first request transmitter unit that transmits each of:

(1) the transfer request from the storage apparatus to the user terminal that has generated and transmitted a request for the device information, the transfer request including a data transmission request requesting the device to transmit the data to the storage apparatus, and (2) a communication address assigned to the device via the requesting unit, so that both the transfer request and the communication address is transmitted from the storage apparatus, in reply to the request received at the storage apparatus, wherein the transfer request requesting the user terminal to transfer the data transmission request to the device so that when the transmitted transfer request is received on the user terminal, the user terminal transfers the data transmission request included in the transfer request to the device having the communication address assigned thereto, wherein in response to the device receiving the data transmission request transferred from the user terminal, updated data stored on the device is transmitted to the storage apparatus and the device information is updated; and a device information transmitter unit that receives the updated data transmitted by the second transmitter unit of the device in response to the storage apparatus receiving the updated data from the device, and transmits the updated device information responsive to the updated data from the storage apparatus to the user terminal in reply to a request in response to the user terminal having requested the device information places an additional request for the updated device information.

5. The storage apparatus according to claim 4, wherein the communication system comprises a plurality of devices;

wherein the writing unit receives the data transmitted from the first transmitter unit of each of the devices, and writes the received data on the second storage unit;

wherein the storage apparatus comprises an extracting unit;

wherein if the requesting unit of the user terminal requests the device information, the extracting unit extracts, from among the devices, a device not having transmitted the data via the first transmitter unit since at least a predetermined period of time earlier than the time of request of the device information; and wherein the first request transmitter unit transmits, in reply to the request, the transfer request including the communication address assigned to the device extracted by the extracting unit to the user terminal having requested the device information via the requesting unit.

6. The storage apparatus according to claim 4, further comprising:

an updating unit that receives the data transmitted by the second transmitter unit of the device, and updates the data stored on the second storage unit in response to the received data; and a notification request transmitter unit that transmits in reply to a request a notification request to the user terminal having placed the request for the device information via the requesting unit, the notification request requesting the user terminal to notify a user that the updating unit has updated the data.

7. The storage apparatus according to claim 5, further comprising:

an updating unit that receives the data transmitted by the second transmitter unit of the device, and updates the data stored on the second storage unit in response to the received data; and a notification request transmitter unit that transmits in reply to a request a notification request to the user terminal having placed the request for the device information via the requesting unit, the notification request requesting the user terminal to notify a user that the updating unit has updated the data.

8. The storage apparatus according to claim 4, wherein the device information comprises at least one of a record of a month or a value cumulative of power consumption or number of images formed.

9. The storage apparatus according to claim 4, wherein the device information comprises at least one of time and date of image forming, an amount of image formed, or power consumed per month.

10. A communication system comprising a user terminal connected to a first communication line, a device connected to the first communication line, and a storage apparatus connected to a second communication line, a communication originated at the storage apparatus and addressed to the device and the user terminal being blocked by a firewall apparatus while a communication from the storage apparatus to the user terminal in reply to a request from the user terminal being permitted by the firewall apparatus, wherein the device includes a first storage unit connected to the first communication line and storing the data, a first transmitter unit transmitting the data stored on the first storage unit to the storage apparatus connected to the second communication line, and a second transmitter unit transmitting the data stored on the first storage unit to the storage apparatus if the data transmission request is transferred from a transferring unit;

wherein the user terminal includes a requesting unit and the transferring unit, the requesting unit generating a request for device information responsive to the data to the storage apparatus via the first communication line and the second communication line, the transferring unit on the user terminal receiving a transfer request transmitted from the storage apparatus so that the device information is routed from the device to the user terminal via the storage apparatus, if the device information has not been updated for a period of time, the transfer request including a data transmission request and a communication address assigned to the device, the transfer request requesting the user terminal to transmit the data transmission request to the device, the transferring unit transferring the data transmission request included in the transfer request to the device having the communication address assigned thereto and included in the transfer request; and wherein the storage apparatus includes:

a writing unit that receives the data of the device transmitted by the first transmitter unit of the device to the storage apparatus via the first communication line and the second communication line, and writes the received data on a second storage unit;

a first request transmitter unit that transmits (1) the transfer request from the storage apparatus to the user terminal that has generated and transmitted a request for the device information, the transfer request including a data transmission request requesting the device to transmit the data to the storage apparatus and (2) a communication address assigned to the device via the requesting unit so that both the transfer request and the communication address is transmitted from the storage apparatus, in reply to the request received at the storage apparatus, wherein the transfer request requesting the user terminal to transfer the data transmission request to the device so that when the transmitted transfer request is received on the user terminal, the user terminal transfers the data transmission request included in the transfer request to the device having the communication address assigned thereto, wherein in response to the device receiving the data transmission request transferred from the user terminal, updated data stored on the device is transmitted to the storage apparatus and the device information is updated; and a device information transmitter unit that receives the updated data transmitted by the second transmitter unit of the device in response to the storage apparatus receiving the updated data from the device, and transmits the updated device information responsive to the updated data from the storage apparatus to the user terminal in reply to a request in response to the user terminal having requested the device information places an additional request for the updated device information.

11. The communication system according to claim 10, further comprising a plurality of devices,
wherein the first transmitter unit of each of the plurality of devices transmits the data;
wherein the writing unit writes a plurality of received data on the second storage unit;
wherein the storage apparatus includes an extracting unit;
wherein if the requesting unit of the user terminal requests the device information, the extracting unit extracts, from among the devices, a device not having transmitted the data via the first transmitter unit since at least a predetermined period of time earlier than the time of request of the device information; and
wherein the first request transmitter unit transmits, in reply to a request for the device information, the transfer request including the communication address assigned to the device extracted by the extracting unit to the user terminal having placed the request for the device information via the requesting unit.

12. The communication system according to claim 10, further comprising a plurality of devices,
wherein the first transmitter unit of each of the plurality of devices transmits the data;
wherein the writing unit in the storage apparatus receives a plurality of data transmitted from the first transmitter unit and writes the plurality of data on the second storage unit;
wherein the requesting unit in the user terminal requests the storage apparatus to transmit a plurality of pieces of device information;
wherein the first request transmitter unit in the storage apparatus transmits in reply to the request to the storage apparatus the transfer request to the user terminal having requested the storage apparatus to transmit the plurality of pieces of device information, the transfer request including the data transmission request requesting the plurality of devices to transmit the data to own storage apparatus, and the communication addresses respectively assigned to the plurality of devices, the transfer request requesting the user terminal to transmit the data transmission request to one of the plurality of devices;
wherein the transferring unit in the user terminal receives the transfer request transmitted from the first request transmitter unit, and transfers the data transmission request included in the transfer request together with a communication address to the device having the communication address assigned thereto from among the communication addresses included in the transfer request;
wherein the device includes a second request transmitter unit;
wherein if the data transmission request is transferred from the user terminal together with a plurality of communication addresses, the second request transmitter unit transmits to the user terminal the transfer request excluding the communication address assigned to own device from among the plurality of communication addresses; and
wherein the transferring unit in the user terminal transfers to the device the data transmission request included in the transfer request transmitted from the second request transmitter unit together with the communication address included in the transfer request and assigned to one of the devices.

13. The communication system according to claim 11, further comprising a plurality of devices,
wherein the first transmitter unit of each of the plurality of devices transmits the data;
wherein the writing unit in the storage apparatus receives a plurality of data transmitted from the first transmitter unit and writes the plurality of data on the second storage unit;
wherein the requesting unit in the user terminal requests the storage apparatus to transmit a plurality of pieces of device information;
wherein the first request transmitter unit in the storage apparatus transmits in reply to the request to the storage apparatus the transfer request to the user terminal having requested the storage apparatus to transmit the plurality of pieces of device information, the transfer request including the data transmission request requesting the plurality of devices to transmit the data to own storage apparatus, and the communication addresses respectively assigned to the plurality of devices, the transfer request requesting the user terminal to transmit the data transmission request to one of the plurality of devices;
wherein the transferring unit in the user terminal receives the transfer request transmitted from the first request transmitter unit, and transfers the data transmission request included in the transfer request together with a communication address to the device having the communication address assigned thereto from among the communication addresses included in the transfer request;
wherein the device includes a second request transmitter unit;
wherein if the data transmission request is transferred from the user terminal together with a plurality of communication addresses, the second request transmitter unit transmits to the user terminal the transfer request excluding the communication address assigned to own device from among the plurality of communication addresses; and
wherein the transferring unit in the user terminal transfers to the device the data transmission request included in the transfer request transmitted from the second request transmitter unit together with the communication address included in the transfer request and assigned to one of the devices.

14. The communication system according to claim 10, further comprising a notification unit that gives a user a notification,
wherein the device includes a notification request transmitter unit that transmits a notification request to the user terminal having transferred the data transmission request, the notification request requesting the user terminal to notify the device that the data is transmitted from the second transmitter unit; and
wherein the notification unit in the user terminal notifies the user that the data is transmitted if the notification request transmitter unit receives the notification request.

15. The communication system according to claim 11, further comprising a notification unit that gives a user a notification,
wherein the device includes a notification request transmitter unit that transmits a notification request to the user terminal having transferred the data transmission request, the notification request requesting the user terminal to notify the device that the data is transmitted from the second transmitter unit; and wherein the notification unit in the user terminal notifies the user that the data is transmitted if the notification request transmitter unit receives the notification request.

16. The communication system according to claim 12, further comprising a notification unit that gives a user a notification, wherein the device includes a notification request transmitter unit that transmits a notification request to the user terminal having transferred the data transmission request, the notification request requesting the user terminal to notify the device that the data is transmitted from the second transmitter unit; and wherein the notification unit in the user terminal notifies the user that the data is transmitted if the notification request transmitter unit receives the notification request.

17. The communication system according to claim 13, further comprising a notification unit that gives a user a notification, wherein the device includes a notification request transmitter unit that transmits a notification request to the user terminal having transferred the data transmission request, the notification request requesting the user terminal to notify the device that the data is transmitted from the second transmitter unit; and wherein the notification unit in the user terminal notifies the user that the data is transmitted if the notification request transmitter unit receives the notification request.

18. The communication system according to claim 10, wherein the device information comprises at least one of a record of a month or a value cumulative of power consumption or number of images formed.

19. The communication system according to claim 10, wherein the device information comprises at least one of time and date of image forming, an amount of image formed, or power consumed per month.

* * * * *